US009330892B2

(12) United States Patent
Ardelt et al.

(10) Patent No.: US 9,330,892 B2
(45) Date of Patent: May 3, 2016

(54) SIMULTANEOUS INORGANIC MASS SPECTROMETER AND METHOD OF INORGANIC MASS SPECTROMETRY

(71) Applicant: Spectro Analytical Instruments GmbH, Kleve (DE)

(72) Inventors: Dirk Ardelt, Krefeld (DE); Ulrich Heynen, Kalkar (DE); Adi A. Scheidemann, Baden (CH)

(73) Assignee: SPECTRO ANALYTICAL INSTRUMENTS GMBH, Kleve (DE)

( * ) Notice: Subject to any disclaimer, the term of this patent is extended or adjusted under 35 U.S.C. 154(b) by 5 days.

(21) Appl. No.: 14/323,275

(22) Filed: Jul. 3, 2014

(65) Prior Publication Data

US 2014/0312219 A1    Oct. 23, 2014

Related U.S. Application Data

(63) Continuation-in-part of application No. 12/981,607, filed on Dec. 30, 2010, now abandoned.

(60) Provisional application No. 61/291,562, filed on Dec. 31, 2009.

(51) Int. Cl.
*H01J 49/02*       (2006.01)
*H01J 49/32*       (2006.01)
*B01D 59/44*       (2006.01)

(52) U.S. Cl.
CPC ............. *H01J 49/025* (2013.01); *H01J 49/322* (2013.01); *B01D 59/44* (2013.01)

(58) Field of Classification Search
CPC   H01J 49/025; H01J 43/246; H01L 27/14643; H01L 27/14689
See application file for complete search history.

(56) References Cited

U.S. PATENT DOCUMENTS

| | | | |
|---|---|---|---|
| H235 H | 3/1987 | Kugel et al. | |
| 5,196,700 A | 3/1993 | Kameshima | |
| 6,121,618 A | 9/2000 | Morris | |
| 6,313,638 B1 | 11/2001 | Sun et al. | |
| 6,674,068 B1 | 1/2004 | Kammei | |
| 6,756,587 B1 * | 6/2004 | Bateman et al. | 250/287 |
| 6,809,313 B1 * | 10/2004 | Gresham et al. | 250/287 |
| 6,979,818 B2 | 12/2005 | Scheidemann et al. | |
| 7,145,134 B2 | 12/2006 | Gonin et al. | |
| 7,391,000 B2 | 6/2008 | Seyfried et al. | |
| 7,498,585 B2 | 3/2009 | Denton et al. | |
| 2002/0024058 A1 | 2/2002 | Marshall et al. | |

(Continued)

OTHER PUBLICATIONS

"SPECTRO Recognized Among the Winners of R&D 100 Award" SPECTRO/AMETEK Press Release, dated Friday, Jul. 1, 2011.*

(Continued)

*Primary Examiner* — Brooke Purinton
(74) *Attorney, Agent, or Firm* — Pantich Schwarze Belisario & Nadel LLP

(57) ABSTRACT

An inorganic mass spectrometer capable of measuring a relevant and large or the full mass spectral range simultaneously may include a suitable ion source (e.g., an ICP mass spectrometer with an ICP ion source), an ion transfer region, ion optics to separate ions out of a plasma beam, a Mattauch-Herzog type mass spectrometer with a set of charged particle beam optics to condition the ion beam before an entrance slit, and a solid state multi-channel detector substantially separated from ground potential and separated from the potential of the magnet.

21 Claims, 3 Drawing Sheets

(56) References Cited

U.S. PATENT DOCUMENTS

| | | | |
|---|---|---|---|
| 2002/0175292 A1* | 11/2002 | Whitehouse et al. | 250/394 |
| 2003/0034448 A1 | 2/2003 | Yefchak et al. | |
| 2004/0155187 A1 | 8/2004 | Axelsson | |
| 2005/0104003 A1 | 5/2005 | Jarron | |
| 2005/0205930 A1 | 9/2005 | Williams | |
| 2006/0066843 A1 | 3/2006 | Guetta et al. | |
| 2006/0118728 A1 | 6/2006 | Phlips et al. | |
| 2006/0151690 A1 | 7/2006 | Marriott | |
| 2006/0284076 A1 | 12/2006 | Scheidemann et al. | |
| 2007/0176089 A1 | 8/2007 | Scheidemann et al. | |
| 2008/0001069 A1 | 1/2008 | Perlman et al. | |
| 2008/0164550 A1* | 7/2008 | Chen et al. | 257/432 |
| 2009/0242747 A1 | 10/2009 | Guckenberger et al. | |
| 2013/0119247 A1 | 5/2013 | Green et al. | |

OTHER PUBLICATIONS

"Detector Innovation Identifies Wide Mass Range" Research and Development Magazine, Aug. 14, 2011.*

Hieftje, "Extended Detectors and ToF of ICP Ion Sources," 16th ASMS Sanibel Conference (Jan. 23-27, 2004).

Koppenaal et al, "Just as the new laser eye surgery has restored fading human vision, new technologies are needed to improve ion 'chemical vision' detection," Analytical Chemistry, pp. 3A-11A (Nov. 1, 2005).

Kibelka et al, "A Transportable Double-Focusing Mass Spectrometer," 7th HEMS Workshop (Sep. 21-24, 2009).

Furstenau et al, "Active Pixel Sensors for Mass Spectrometry," Int. J. of MS, vol. 215, pp. 101-111 (2002).

Turchetta et al, "A monolithic active pixel sensor for charged particle tracking and imaging using standard VLSI CMOS technology," Nuclear Instruments and Methods in Physics Research Section A: Accelerators, Spectrometers, Detectors and Associated Equipment, vol. 458, No. 3, pp. 677-689 (2001).

Takayanagi et al, "A low dark current stacked CMOS-APS for charged particle imaging," Electron Devices Meeting, IEDM '01 Tehcnical Digest, vol. 24, No. 2, pp. 1-4 (2001).

Hieftje, "Emergence and impact of alternative sources and mass analyzers in plasma source mass spectrometry," J. Anal. At. Spectrom., vol. 23, pp. 661-672 (2008).

Schilling et al, "Evaluation of a 512-Channel Faraday-Strip Array Detector Coupled to an Inductively Coupled Plasma MAttach-Herzog Mass Spectrograph," Analytical Chemistry, vol. 81, No. 13, pp. 5467-5473 (Jul. 1, 2009).

Global Assessment Report 9th Edition, "The Laboratory Analytical and Life Science Instrument Industry 2006-010," SDI Los Angeles, Sep. 2006.

* cited by examiner

SIMULTANEOUS INORGANIC MASS SPECTROMETER AND METHOD OF INORGANIC MASS SPECTROMETRY

CROSS-REFERENCE TO RELATED APPLICATIONS

This application is a continuation-in-part of U.S. patent application Ser. No. 12/981,607, filed on Dec. 30, 2010, which claims priority to U.S. Provisional Patent Application No. 61/291,562, filed on Dec. 31, 2009, both of which are incorporated herein by reference.

FIELD OF THE INVENTION

Embodiments of the present invention relates to the area of inorganic mass spectrometry. Known, but in no way limiting, implementations of inorganic mass spectrometry (MS) in the context of the invention claimed are ICP-MS, GD-MS, TIMS or Spark Source MS.

BACKGROUND

In the field of inorganic mass spectrometry, a constant necessity exists for yet even higher sensitivity, faster speed of measurement and greater precision, the latter e.g. for isotope ratio measurements or the use of isotope dilution analysis. ICP-MS, using an inductively coupled Argon plasma ("ICP") at atmospheric pressure as the ionization source, has become the de-facto standard for inorganic mass spectrometry aiming at (trace and ultra-trace) concentration measurements. GD-MS, using a (typically Ar) glow discharge (DC or RF) at reduced pressure allows for sensitive direct concentration analysis of solid materials and thin layers, without digestion steps that might be required for (liquid sample based) ICP-MS, whereas TIMS, thermal ionization mass spectrometry, is mainly used for precise isotope ratio determinations, mainly in the geological field.

For ICP-MS, the mainstay (90% of the ICP-MS units shipped in 2005, Source: Global Assessment Report $9^{th}$ Edition "The Laboratory Analytical and Life Science Instrument Industry 2006-2010", SDI Los Angeles, September 2006) of commercially available instruments still employ a quadrupole mass filter as analyzer, a truly sequential ('mass filtering') device. Additionally, "high mass resolution" variants, employing a scanning sector field mass analyzer, e.g. of the (reverse) Nier-Johnson design, are known, which, using a single detector, again are sequential in nature. Only a very small amount of "semi-simultaneous" inorganic mass spectrometers exist commercially, either employing several (normally <10) detectors that can be moved in a focal plane, or using a time-of-flight mass analyzer. Up to now, no fully simultaneous (=allowing to simultaneously capture the full inorganic mass spectrum in one or only few (≤3) measurements) are commercially available, very much contrary to the situation in atomic emission spectrometry, where sequential spectrometers have mainly been replaced by simultaneous full-spectrum instruments.

Besides concentration information, also ICP-MS and GD-MS allow for the determination of isotope ratios of sample constituents. However, for precise isotope ratio determination, present day instrumentation in the field of inorganic mass spectrometry for a large part is limited by its sequential nature, resulting from the technologies employed. Caused by the unavoidable ion source fluctuations in both time and space, known e.g. as flicker noise for ICP-MS, the achievable precision for isotope ratio determinations is fundamentally limited for a sequential device, such as a quadrupole mass filter or a scanning sector field mass analyzer.

Apart from a more precise determination of isotope ratios, also other reasons make a (fully) simultaneous inorganic mass spectrometer desirable. For instance, the "multiplex" or "Fellgett's Advantage" dictates that for a continuous multichannel signal and for a given total integration time a simultaneous measurement of all channels results in a better signal-to-noise ratio than a sequential channel after channel measurement of the same (total) integration time. In inorganic mass spectrometry, this advantage translates into shorter measurement times to reach the same signal to background ratio, especially if many masses (isotopes) are to be measured (as in typical environmental applications). Shorter measurement times per sample increase the sample throughput, with the positive effects of less sample consumption (and the possibility of using smaller sample volumes), less energy and media consumption and finally less waste production.

Apart from higher sample throughput, in inorganic mass spectrometry, faster measurement times, independent of the number of channels (=isotopes) sampled, are of great interest for all methods generating transient signals, signals that change as a function of time. Among such methods are, for instance, the on-line coupling to inorganic mass spectrometry instruments ("hyphenation") of separation systems like gas- or liquid phase chromatography, of direct solid sample introduction systems like electro-thermal vaporization, spark or laser ablation, or of flow injection systems. All transient signal generating methods require short measurement times per data point in time, to avoid the so-called "peak skewing", caused by missing the maximum signal of a given transient signal resulting from slow scanning, as found in sequential devices (transient signal artifacts resulting from insufficient sampling frequency). Thus, for sequential devices, the amount of channels that can be measured reliably with (fast) transient signals is strongly limited, compared to a (fully) simultaneous device, able to measure "all" channels reliably as a function of time. With hyphenation methods gaining more and more interest in inorganic mass spectrometry, it is obvious that a (fully) simultaneous device is instrumental in achieving better data quality with transient measurements.

The same benefit of shorter measurement times applies for GD-MS e.g. in the case of thin layers analysis. Here, the amount of constituents that can be determined simultaneously with a given depth resolution is limited by the scan speed of a sequential device. In contrast to that, a (fully) simultaneous instrument allows for a constant depth resolution, independent of the number of constituents desired to be analyzed.

It is thus clear after the aforementioned advantages of such system that a clear need exists for an inorganic mass spectrometer, capable of measuring simultaneously the full inorganic mass range (typically $Li^6$ to $U^{238}$), in one or very few (≤3) individual measurements. It is also obvious that this need currently commercially is neither fulfilled by sequential instruments based on the quadrupole mass filter, nor the existing so-called "multi-collector" instruments, having only a very limited number (<10) of simultaneous channels. Apart from the mentioned, also TOF (time-of-flight) mass analyzer based instruments for inorganic mass spectrometry exist commercially. Although TOF based instruments allow for a simultaneous spectrum capture, their pulsed sampling nature resulting from the need of waiting for the ion pulse sampled to fully travel through the drift tube of the analyzer results in a limited sample rate that does not utilize the cw ion beam originating from the ion source, e.g. the atmospheric Ar plasma. Compared to a truly fully simultaneous inorganic mass spectrometer, the TOF analyzer based system exhibit worse signal-to-noise ratios for a given total integration time, depending on their sampling rate and duty cycle, as expected from sampling theory. Again, the advantages of a fully simultaneous system over TOF-based systems are obvious.

One goal of the claimed invention may thus be to remedy this unsatisfying situation by creating a fully simultaneous inorganic mass spectrometer, allowing to measure the full inorganic mass range (typically $Li^6$ to $U^{238}$) in a single or very few ($\leq 3$) measurements. Apart from providing means for a simultaneous measurement over a large mass range, also sufficient signal dynamic range and resolution of adjacent mass signals may be provided, as common in inorganic mass spectrometry; see, e.g., Montaser, Akbar, ed., *Inductively Coupled Plasma Mass Spectrometry*, Wiley-VCH (1998) for a discussion of typical specifications for commercially available ICP-MS.

SUMMARY OF EMBODIMENTS OF THE INVENTION

An object of some embodiments of the invention is to provide an inorganic mass spectrometer in which a very wide mass range can be measured truly simultaneously, which allows for an efficient separation of analyte ions and other signal constituents (e.g. photons, electrons, (hot) neutrals)) produced in the ion source and which can partially suppress the carrier gas ions. Suppressing the carrier gas ions allows more accurate measurements in mass ranges close to the mass of the carrier gas ion. The carrier gas may be argon (Ar), but is not limited thereto.

BRIEF DESCRIPTION OF THE DRAWINGS

Embodiments of the invention will now be described in conjunction with the attached drawings, in which.

DETAILED DESCRIPTION OF EMBODIMENTS OF THE INVENTION

The following describes the claimed invention in the specific implementation as ICP mass spectrometer. However, the invention is not limited to this specific implementation and can be applied in the field of inorganic mass spectrometry in many other obvious ways. For an ICP-MS, the objective may be achieved through a mass spectrometer set up that includes:
- An ICP ion source on or close to ground potential
- An ion transfer region ("vacuum interface") with concentric nozzles (sampler and skimmer) and symmetric pump ports
- A set of charged particle optics [thereafter called "CPO"] to extract the ions out of the skimmer region
- CPO to separate the ions from the plasma beam's other constituents (photons, neutrals, etc.) and to partially separate the carrier gas ions from the analyte ions,
- A set of CPO beam optics to precondition the ion beam before the mass spectrometer entrance slit
- A Mattauch Herzog type mass spectrometer
- A solid state multi channel detector with an electrical potential substantially separated from ground potential and which can also be separated from the magnet potential,
- A mask between detector and magnet,
- A potential applied to the mask which may be different to both the potentials applied to detector and/or the potential applied to the magnet.

Figure 1:
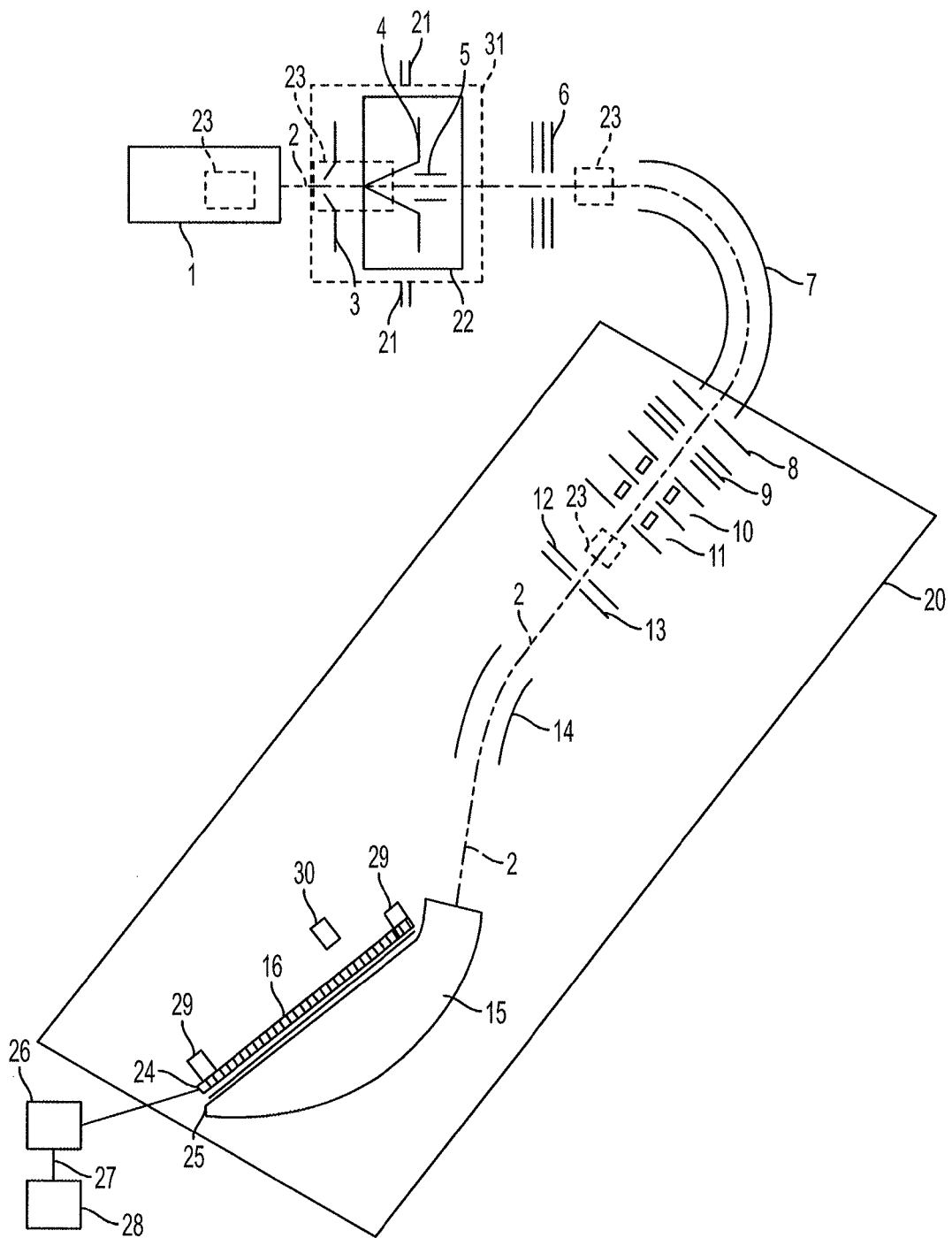
FIG. 1 shows a diagram of an exemplary structure of an embodiment of the invention.

Referring to FIG. 1, the ICP source 1 may be mounted adjacent to the evacuated ion transfer region, thus the plasma beam 2 may hit the sampler nozzle 3. ICP source 1, vacuum-interface 31, a pre-filter, or the CPO may include a collision or reaction cell 23. After traversing the sampler nozzle 3, the central part of the beam may be skimmed out by the skimmer nozzle 4. The region between sampler and skimmer may be evacuated to ca. 2 Torr. Two pumping ports 21, symmetrically placed, may be used to provide sufficient pumping speed and ensure a symmetric gas flow which does not distort the ion beam.

After passing the skimmer nozzle 4, the charged particles may be extracted out of the vicinity of the skimmer region by the extractor ion lens 5; thus a separation between positively charged ions and electrons may be achieved.

The extractor ion lens 5 may be partially placed into the skimmer 4 to ensure efficient ion transfer. In ICP-MS, the skimmer and especially the extractor ion optics may need periodic cleaning services. To aid the service of the instrument, the skimmer 4 and extractor 5 may be located in a joint mount 22. By so doing, both of these elements may be conveniently removed as a unit for service.

The positively charged ions [thereafter called "ions"] may be guided by a set of charged particle optics into a first electrostatic sector field [thereafter called "Pre-Filter"]. This Pre-Filter may include a pre-filter lens 6 and electrostatic pre-filter 7, and may act to bend the ion flight pass, and therefore, electrically neutral particles (including any spectral background increasing electronically exited neutral particles) and photons produced by the ion source concomitant with the analyte ions may be separated out of the ion beam, since such neutral particles are not affected by the applied potentials.

Since the Pre-Filter represents an electro static sector analyzer, its ejection angle is a function of the ion energy. The ion energy is provided by:

$$E\text{-ion} = E\text{-potential} + E\text{-in-source}. \quad \text{(Eq. 1)}$$

The ion energy [E-ion] is dominated by the potential of the ion optics [E-potential], however, the in-source ion energy [E-in-source] cannot be neglected. This component may be different for the seeded analyte ions and the carrier gas ions. Since the ejection angle for the ions out of the energy filter is energy dependent, the analyte and carrier gas ions hit the object slit downstream of the Pre-filter at different positions.

This effect, together with the narrow object slit [thereafter called OS], partially separates the carrier gas ions from the analyte ions. While this effect could provide a complete separation, due to the given beam width and the instrument dimensions, the separation described here might not be 100%. If desired, the beam can also be focused almost entirely onto the OS to suppress this separation.

The instrument design may have a differential pumping stage between a vacuum chamber housing the Pre-Filter and a following vacuum chamber. This following vacuum chamber will be called the Main-Chamber.

The differential pumping stage between Pre-Filter and Main-Chamber is designed as charged particle optics. The main chamber may house an Optical-Bench 20. This optical-bench 20 may be electrically separated from ground, and according to equation 1, its potential in first approximation defines the ion energy in this stage.

The first group of CPO on the Optical-Bench 20, following aperture 8, may be a set of Einzel lenses 9 followed by two electrostatic quadrupole elements 10, 11 separated with shunts. These elements may help to focus the beam 2 and image the round beam onto a rectangular object slit 13, located beyond an aperture 12.

In traditional magnetic sector instruments the Object-Slit 13 may be a flat conductive plate holding a narrow slit. This slit may then be imaged onto the detector. Therefore a smaller Object-Slit 13 may provide an increased resolution (see equation 2).

$$\text{Peakwidth} = 2^{0.5} \times \text{OS Slitwidth} \times (\text{Radius of Trajectory in Magnet})/(\text{Radius of Trajectory in ESA}). \quad \text{Equation 2}$$

The ion trajectories may be shielded with a Faraday shield (not shown) from the electric potential of the vacuum housing which is on ground potential.

After passing the OS 13, the ions may then be separated by energy in the electrostatic sector analyzer 14 [thereafter called "ESA"].

After traversing the ESA 14, the ions may cross an additional aperture (not shown) placed between the magnet 15 entrance and an exit shunt of the electrostatic sector analyzer 14.

This aperture may be placed approximately half way between the two aforementioned optical elements (ESA 14 and Magnet 15). The aperture may be on the potential of the Optical-Bench 20 and may have dimensions (width×height) that may, for example, be determined empirically.

In the Magnet 15, the ions may be separated by momentum—due to the upstream ESA 14, in good approximation, the ions have the same energy—the separation may thus be according to mass. The Magnet 15 may be a classical Mattauch-Herzog layout; a typical gap width may be 6 mm, with a field strength ranging from 0.5 Tesla up to 1.5 Tesla. Typical focal plane length may be between 50 and 150 mm, and an exemplary implementation of the system presented here may use a focal plane length of ca. 120 mm.

The Magnet 15 may be mounted onto the Optical-Bench 20 (which is electrically separated from ground); additionally the Magnet 15 may be held in place by a clamp (not shown). This clamp may additionally carry a detector mount. The detector 16 may generally be electrically isolated from (1) the Optical-Bench 20, (2) the Magnet 15, and (3) from ground potential.

A mask 25 may be placed between the Magnet 15 and the Detector 16. This mask 25 may be electrically isolated from the Magnet 15 and the Detector 16. A potential may be applied to the mask 25 [called "mask potential"].

Since the trajectories of the ions passing through the Magnet 15 are typically not perfectly parallel to the Magnet 15 poles, small angle scattering of the ions against the top and bottom of the Magnet 15 poles may occur. This scattering may lead to a spread of the measured beam width on the detector 16. A mask allowing only the central part of the detector to be exposed to the beam may thus reduce this effect.

A potential applied to the mask 25 may be electrically attractive to electrons that may be released by ions hitting the detector 16 surface (sputtering). These electrons can be captured by the mask 25, if a suitable potential is applied. With a typical gap in the Magnet 15 of 6 mm, the mask 25 may reach into the gap between 0.5 mm and 1 mm.

Figure 2:
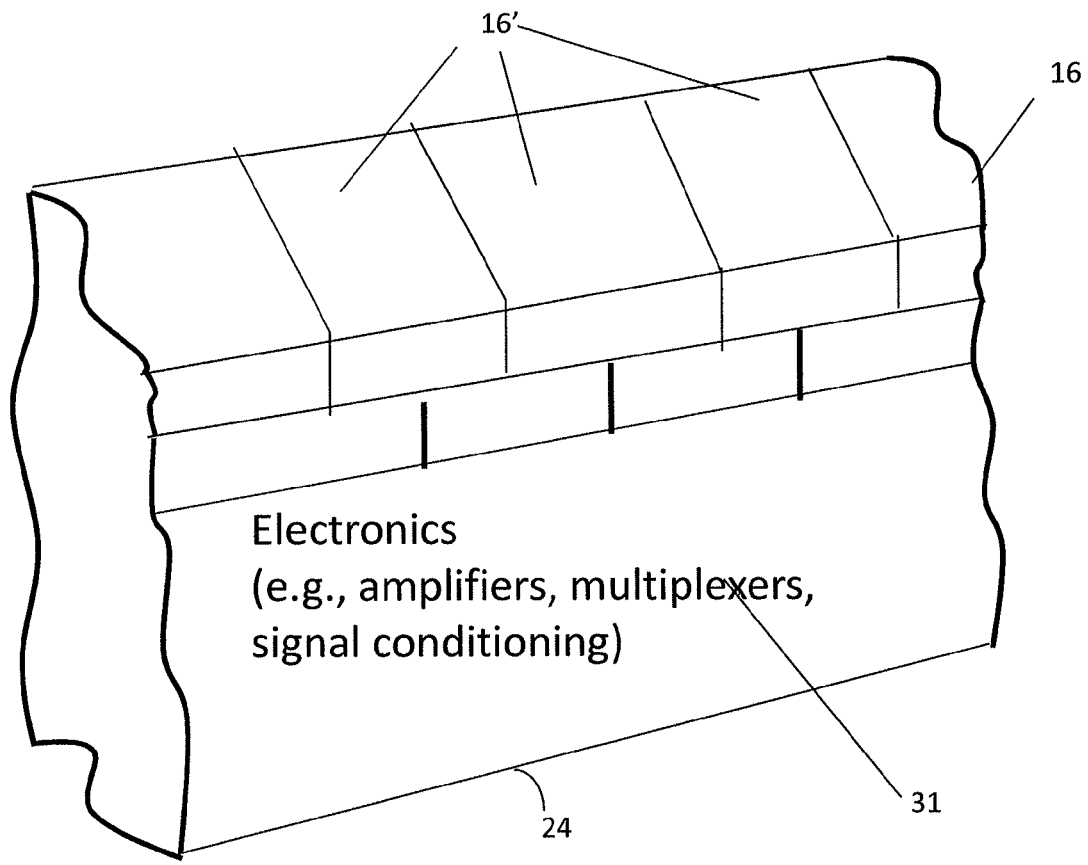
FIG. 2 shows an expanded diagram of an example of a portion of a detector that may be used in an embodiment of the invention.

An example of Detector 16 is shown in greater detail in FIG. 2 and may be composed of:
Monolithic CMOS-Detector with different gains and different collector areas 16'.
Detector-Carrier
Connector-PCB
Peltier cooler
Detector-Body
Water-Cooler
Amplifier-PCB
Fully floatable camera board with optical data communication and isolation against float potential
Fiber optical cable The charged particle detector 16 may be a monolithic CMOS detector; thus, the charge receiving elements 16', various associated electronics 31, such as the bus and/or multiplexer, and (an) amplifier(s) may be placed on a single substrate 24, such as a single piece of silicon. It is noted that in FIG. 2, connections between the receiving elements 16' and the electronics 31 are shown conceptually as thick lines and are not intended to define any particular number of such connections but are merely to represent that such connections may generally exist between the receiving elements 16' and the electronics 31, as would be understood by one skilled in the art.

To increase the dynamic range of the detector, the unit may have two different gains, and additionally, their charge receiving areas 16' may be different in size, as is reflected in FIG. 2. The two different gains may be alternating on the strip charge detector array, whereby the buses/multiplexer are opposing each other.

Figure 3:
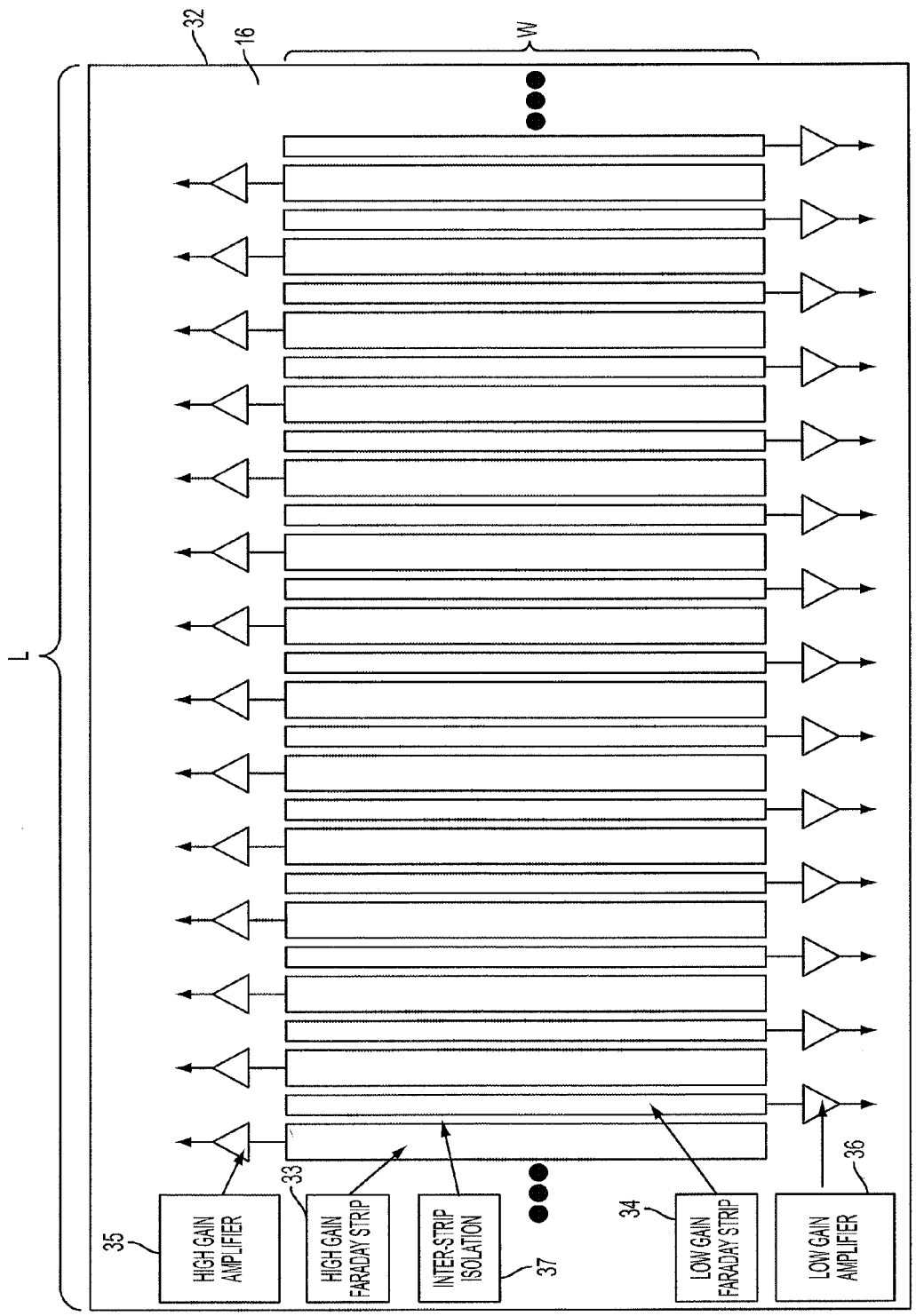
FIG. 3 shows a further example diagram of a detector according to various embodiments of the invention.

A further example of detector 16 (of FIG. 1) is shown in FIG. 3. As shown in FIG. 3, detector 16, which may be formed on a single substrate 24 (not shown in FIG. 3), may also be mounted on a board, e.g., a printed circuit board 32 (as noted below, the detector 16 may, in some implementations, be directly attached to a metal "Detector-Carrier," which may, in turn, be mounted on board 32). Detector 16 may include alternating strip detector elements ("strips" hereinafter) of different widths 33, 34, forming pairs of adjacent strips covering the detector 16 along its length L and arranged parallel to its width W. Strips 33, 34 may be Faraday strips. As shown in FIG. 3, strips 33 are shown as being wider than strips 34; but the invention is not thus limited, and in other examples, strips 34 may be the wider strips and strips 33 may be the narrower strips. Additionally, while strips 33 and 34 occur in pairs, the strips need not be in the same order in all pairs (for example, the sequences or pairs, "wide", "narrow", "narrow", "wide", and "narrow", "wide", "wide", "narrow", are also contemplated). In particular example, there may be 4800 pairs of wide strips 33 and narrow strips 34 (i.e., a total of 9600 strips). In a further example, the wide strips 33 may have a width of 12 μm, the narrow strips may have a width of 6 μm, and a pair of strips may have a total width of 25 μm. In a particular example, the strips may all have a length of 6 mm (i.e., across detector structure 16). In a further example, strips are separated by an inter-strip isolation region 37; in some implementations, the inter-strip isolation region may be of the same width between all strips 33, 34 of the detector 16.

As a result of the differences in widths, strips 33 and 34 have different sensitivities. A wide strip 33 has more surface area and is thus more sensitive, while a narrow strip 34 has less surface area and is thus less sensitive. When the ions are separated in the apparatus preceding the detector 16, they may typically form a spectrum of masses, which may be conceptually thought of similarly to line spectra produced during optical spectrometry. That is, ions of different masses may be received in different regions of the detector, and also as in optical spectrometry, such "lines" may have different intensities, depending upon the composition of a sample being tested. The use of pairs of more-sensitive wide strips 33 and less-sensitive narrow strips 34 may permit simultaneous measurement of different intensities of ions across a wide spectrum and may thus enable a wide dynamic range.

In particular, the wide strips 33 may be connected to high-gain amplifiers 35, while the narrow strips 34 may be connected to low-gain amplifiers 36, and the better-quality result may be used as the measurement of the particular portion of the spectrum covered by a given pair. That is, if a particular "line" of the ion spectrum is weak in a particular region measured by a particular pair of strips 33, 34, more ions may be detected by the wide strip 33 than by the narrow strip 34; the narrow strip 34 may, in some cases, be unable to detect any ions or may only detect very few ions, while in such a situation, the wide strip 33 may be able to detect relatively more of the ions. In combination with a high-gain amplifier 35, this may result in a meaningful measurement, e.g., of a trace element in a sample. Similarly, if a particular "line" of the ion spectrum is strong in a spectral region measured by a particular pair 33, 34, the wide strip 33/high-gain amplifier 35 combination may be saturated and incapable of providing a meaningful measurement, while the narrow strip 34/low-gain amplifier 36 combination may be capable of providing a meaningful measurement in such a case.

In some implementations, the high-gain amplifiers 35 to which the wide strips 33 are connected may all be placed on board 32 on one side of the detector 16, while the low-gain amplifiers 36 may all be placed on board 32 on an opposite side of the detector 16. Alternatively, the high-gain and low-gain amplifiers may be interspersed on both sides of detector 16. That is, the invention is not limited to any particular arrangement of the high-gain and low-gain amplifiers with respect to the placement of the detector.

The signal flow may thus be as follows:
1) The charge may be received on the monolithic CMOS-Detector 16, where this chip may be wire bonded to the Connector-PCB 32.
2) The Connector-PCB 32 may be connected to the Amplifier-Board, which may also be electrically floated from ground, typically at the detector potential.
3) The Amplifier-Board may be connected to the Camera-Board 26. The Camera-Board 26 may be separated from ground, e.g., by an isolation transformer or a suitable DC:DC converter and may be floated, typically at the detector potential, with a conventional high voltage power supply.
4) The Camera-Board 26 may communicate via an optical data connection via a fiber optic cable 27 connected to the data receiving station 28

The monolithic CMOS detector 16 may be glued onto a Detector-Carrier, which may preferably be made from metal, e.g. copper.

The glue may preferably be a thermally well-conducting glue such as, but not limited to, thermally conductive epoxy; the thickness of the glue may preferably be as thin as possible, and typical thicknesses may range from 10 to 150 muem.

The Detector-Carrier may hold, besides the CMOS-Detector, two printed circuit boards [Connector-PCB 32] that may be used to interface the monolithic CMOS detector to an Amplifier-Board. The electrical connection between the CMOS-Detector and the Connector-PCB 32 may be done, e.g., with wire bonding. In an alternative embodiment, the Amplifier-Board and the Connector-PCB 32 may be a single board, e.g., as shown in FIG. 3.

The Detector-Carrier may be cooled with two Peltier elements 29, and this cooling may typically be to substantially below 0 degree Celsius.

The temperature measurement may be performed contactlessly, e.g., via an IR sensor 30 (e.g., of the pyrometric type) to avoid an electrical contact between the Detector-Carrier at high voltage and the temperature read-out electronics.

The Detector-Carrier (and thus the CMOS-Detector 16 and the Connector-PCB 32) may be electrically isolated from the hot side of the Peltier elements 29 through the ceramic body of the Peltier elements 29. Therefore, the Peltier elements 29 may act as both cooling medium and electrical isolation body.

The hot side of the Peltier elements 29 may be placed against the Detector-Body. The Detector-Body may be on ground potential, and the Detector-Body may be water cooled.

The Peltier elements 29 may be sandwiched between the Detector-Body and the Detector-Carrier, e.g., using electrically and thermally isolated screws.

Using electrically isolated precision elements, the Detector-Body may be mounted against the Optical-Bench 20 and the clamp holding the Magnet 15.

The Amplifer-PCB may typically be electrically isolated from the Detector-Body. The amplified electrical signal may be conditioned in the electrically isolated Camera-PCB 26, A:D converted and handed over to the data acquisition system 28 (e.g., a PC), e.g., via an optical communications link using a fiber optical cable 27. Thus, a galvanic separation of the floating detector 26 and the data acquisition system 28 can be achieved. The data acquisition system 28 may be used to present spectrometry results to a user and may include a user interface, such as a display, printer, or the like; alternatively, the user interface may be coupled to a further computing device coupled to the data acquisition system 28.

The electrically floating parts of the detector unit 26 (monolithic CMOS-Detector, Detector-Carrier, Connector-PCB, Amplifier-PCB, Camera-PCB) may be maintained at the same electrical potential; however, this potential may be different from the potential of the Optical-Bench 20 or the Mask 25 or the Magnet 15.

During assembly a guide on each side may be used to locate the Detector-Carrier against the Detector-Body. Thus, the position of the Detector-Carrier may be well defined once the unit is placed into the instrument.

The described implementation is limited to various embodiments of the invention and in no way limits the scope of the invention. Indeed, many variations of the above embodiments would be apparent to one skilled in the art.

What is claimed is:

1. A simultaneous mass spectrometer, comprising:
   an ion source,
   a vacuum interface including a skimmer unit and an extractor unit,
   charged particle optics,
   an object slit, wherein the charged particle optics are configured to focus a plasma beam onto the object slit,
   a Mattauch-Herzog style mass spectrometer including an electrostatic sector analyzer following the object slit and configured to separate by energy ions contained in the plasma beam and followed by at least one magnet configured to receive and to separate by mass the ions output from the electrostatic sector analyzer, and
   a multichannel monolithic complementary metal oxide semiconductor (CMOS) strip detector array configured to simultaneously perform detection over a range of multiple masses, the multichannel monolithic CMOS strip detector array including multiple detector strips of different sizes, wherein the different-size detector strips are coupled to respective elements having first and second gains, which first and second gains are different from each other; and wherein a respective detector strip is coupled to an element having the first gain or an element having the second gain based on a size of the respective detector strip.

2. The mass spectrometer according to claim 1, further comprising an electrostatic sector field pre-filter configured to achieve carrier gas ion/analyte ion separation.

3. The mass spectrometer according to claim 1, wherein the ion source is an inductively coupled plasma (ICP) ion source substantially near ground potential.

4. The mass spectrometer according to claim 1, further comprising two or more pumping ports located symmetrically in a vacuum interface for inductively coupled plasma mass spectrometry (ICP-MS).

5. The mass spectrometer according to claim 1, wherein the skimmer and extractor units are configured to be removed as a single unit, and without disconnecting an electrical connection to an extractor lens unit.

6. The mass spectrometer according to claim 1, wherein the mass spectrometer is configured to use an ion-molecule or -atom chemistry in a collision or reaction cell to achieve carrier gas or interferent ion/analyte ion separation.

7. The mass spectrometer according to claim 1, wherein the Mattauch-Herzog style mass spectrometer is mounted onto an optical bench.

8. The mass spectrometer according to claim 7, wherein the Mattauch-Herzog style mass spectrometer comprises a permanent magnet.

9. The mass spectrometer according to claim 8, wherein the multichannel monolithic CMOS semiconductor detector is separated from the magnet by a conductive electrically isolated and electrically floatable mask.

10. The mass spectrometer according to claim 9, wherein the mask is configured to be at a potential of the detector or at a potential of the magnet.

11. The mass spectrometer according to claim 1, wherein the multichannel monolithic CMOS strip detector array is coupled to one or more multiplexers or signal conditioning electronics.

12. The mass spectrometer according to claim 1, further comprising:
floatable detector electronics; and
a data acquisition system,
wherein the floatable detector electronics is configured to communicate with the data acquisition system via an optical data link.

13. The mass spectrometer according to claim 1, further comprising one or more thermoelectric detector cooling elements.

14. The mass spectrometer according to claim 13, wherein a galvanic separation of the detector is provided via ceramic of the one or more thermoelectric detector cooling elements.

15. The mass spectrometer according to claim 1, further comprising a contactless temperature sensor arranged to measure the temperature of the multichannel monolithic CMOS strip detector array.

16. The mass spectrometer according to claim 1, wherein the multichannel monolithic CMOS semiconductor detector is removably mounted to an optical bench.

17. The mass spectrometer according to claim 1, wherein the mass spectrometer is configured to be capable of measuring the full inorganic mass range from lithium-6 ($Li^6$) to uranium-238 ($U^{238}$) simultaneously in less than four measurements.

18. A method of mass spectrometry, comprising:
performing mass spectrometry on a sample of a substance using the mass spectrometer according to claim 1; and
outputting results of the mass spectrometry to a data acquisition system.

19. The method of claim 18, further comprising displaying results of the mass spectrometry via a user interface.

20. The mass spectrometer according to claim 1, further comprising:
a first bus, multiplexer, or both bus and multiplexer disposed on a first side of the multichannel monolithic CMOS strip detector array; and
a second bus, multiplexer or both bus and multiplexer disposed on a second side of the multichannel monolithic CMOS strip detector array, wherein the second side of the multichannel monolithic CMOS strip detector array is located opposite the first side of the multichannel monolithic CMOS strip detector array in a plane containing the detector strips.

21. The mass spectrometer according to claim 1, wherein the respective elements having the first gain and the respective elements having the second gain are arranged in an alternating fashion on the strip detector array.

* * * * *